(12) United States Patent
Graham

(10) Patent No.: US 6,877,788 B2
(45) Date of Patent: Apr. 12, 2005

(54) ALTERNATIVE MOUNTING FOR REMOVABLE MOTORCYCLE WINDSHIELD

(76) Inventor: Steven M. Graham, 10 Walter La., Oxford, CT (US) 06478

( * ) Notice: Subject to any disclaimer, the term of this patent is extended or adjusted under 35 U.S.C. 154(b) by 0 days.

(21) Appl. No.: 10/703,059

(22) Filed: Nov. 6, 2003

(65) Prior Publication Data

US 2004/0140686 A1 Jul. 22, 2004

Related U.S. Application Data

(60) Provisional application No. 60/424,551, filed on Nov. 7, 2002.

(51) Int. Cl.[7] .............................................. B62J 17/00
(52) U.S. Cl. ................................. 296/78.1; 248/205.1
(58) Field of Search ............................. 296/78.1, 84.1, 296/77.1; 248/205.1; 206/448

(56) References Cited

U.S. PATENT DOCUMENTS

| | | | | |
|---|---|---|---|---|
| 2,903,297 A | * | 9/1959 | Zbikowski | 296/78.1 |
| 4,168,098 A | * | 9/1979 | Willey | 296/78.1 |
| 5,732,965 A | * | 3/1998 | Willey | 296/78.1 |
| 5,845,955 A | * | 12/1998 | Willey | 296/78.1 |
| 5,853,217 A | * | 12/1998 | Armstrong | 296/78.1 |
| 5,857,727 A | * | 1/1999 | Vetter | 296/78.1 |
| 5,927,791 A | * | 7/1999 | De Voe | 296/78.1 |
| 6,196,614 B1 | * | 3/2001 | Willey | 296/78.1 |
| 6,254,166 B1 | * | 7/2001 | Willey | 296/78.1 |
| 6,543,831 B2 | * | 4/2003 | Takemura et al. | 296/78.1 |
| 6,679,537 B1 | * | 1/2004 | Putnam, Jr. | 296/78.1 |
| 2003/0052031 A1 | * | 3/2003 | Poore | 206/448 |
| 2003/0218109 A1 | * | 11/2003 | Farnham | 248/205.1 |

* cited by examiner

*Primary Examiner*—Kiran Patel
(74) *Attorney, Agent, or Firm*—McCormick, Paulding & Huber LLP

(57) ABSTRACT

A pair of rear mounting brackets are constructed to duplicate the front mounting on a motorcycle that holds a detachable windshield. The rear mounting brackets are attached to the motorcycle and are oriented to hold the windshield in a horizontal position behind the rider when the windshield is not in use.

4 Claims, 5 Drawing Sheets

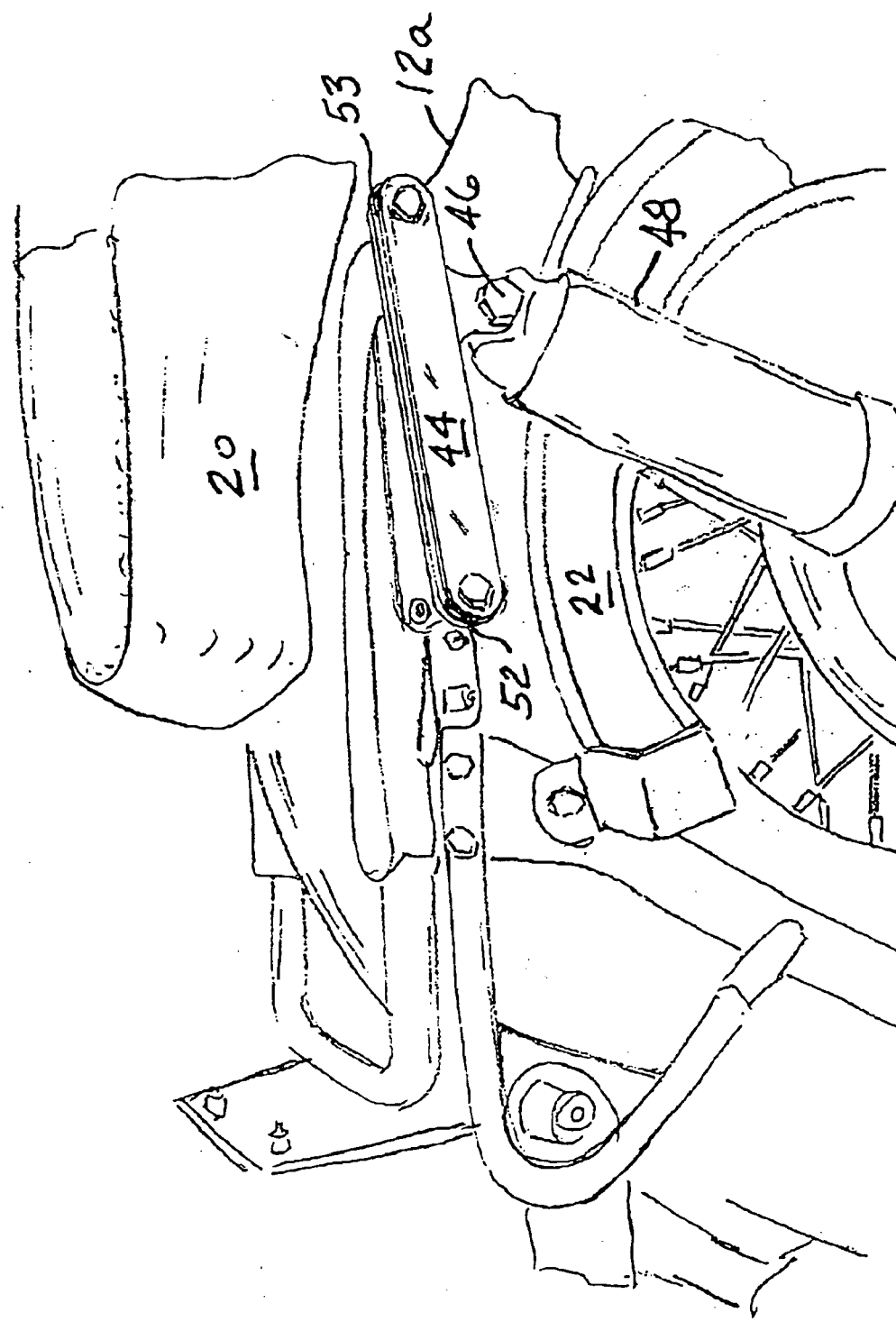

ALTERNATIVE MOUNTING FOR REMOVABLE MOTORCYCLE WINDSHIELD

CROSS REFERENCE TO RELATED APPLICATIONS

This application claims priority of provisional application Ser. No. 60/424,551 filed Nov. 7, 2002.

BACKGROUND OF THE INVENTION

This invention relates to an improvement in a motorcycle with a detachable windshield. Motorcycles are known in the prior art, which include detachable windshields. Exemplary of these are the following U.S. Patents.

| Patent No. | Inventor | Patent Date | Title |
| --- | --- | --- | --- |
| 5,658,035 | Armstrong | Aug. 19, 1997 | Quick Detachable Motorcycle Windshield |
| 5,732,965 | Willey | Mar. 31, 1998 | Mounting System for Motorcycle Accessories |
| 5,835,217 | Armstrong | Dec. 29, 1998 | Quick Detachable Motorcycle Windshield |
| 6,254,166 B1 | Willey | Jul. 3, 2001 | Adjustable Readily Removable Windshield |

When the windshield is detached, there is a problem of what to do with the windshield. While it possible to leave the windshield behind, there may be times during the journey that the rider again desires to attach the windshield, so it must be carried along. Detachable windshields are large, bulky and heavy and, while it may be temporarily tied on or otherwise secured to the motorcycle, this is an unsatisfactory solution.

Accordingly, one object of the present invention is to provide an alternate mounting for a removable motorcycle windshield.

Another object of the invention is to provide an alternate mounting for a detachable windshield which enhances the appearance of the motorcycle.

SUMMARY OF THE INVENTION

Briefly stated, the invention is an improvement in a motorcycle with a detachable windshield of the type having a frame assembly, a front fork having windshield front mounting means thereon, a front wheel rotatably mounted on the front fork, a seat, a rear wheel rotatably mounted on the frame assembly, a detachable windshield having a pair of bracket arms adapted for attachment and detachment from said front mounting means and disposed to hold the windshield in an upright, somewhat slanted position to deflect air from a rider, the improvement comprising rear mounting means attached to said frame assembly above said rear wheel, said mounting means being adapted to cooperate with said bracket arms for attachment and detachment from said rear mounting means and to hold the windshield in a substantially horizontal position above said rear wheel and behind said seat.

In its preferred form, when the windshield has a contoured edge arranged to fit around a headlight on the front fork, the rear mounting means is disposed so as to locate the contoured edge around a portion of said seat. In its preferred form, the rear mounting means comprises parallel plates separated by spacer grommets dimensioned and located to receive said pair of bracket arms in the same manner as said front mounting means.

DRAWING

Figure 1:
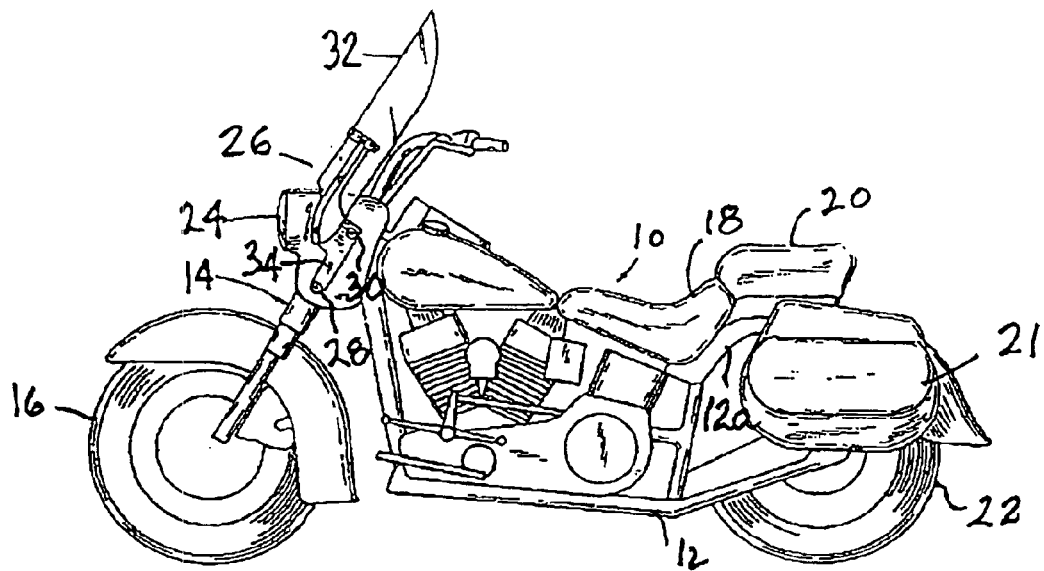
Figure 2:
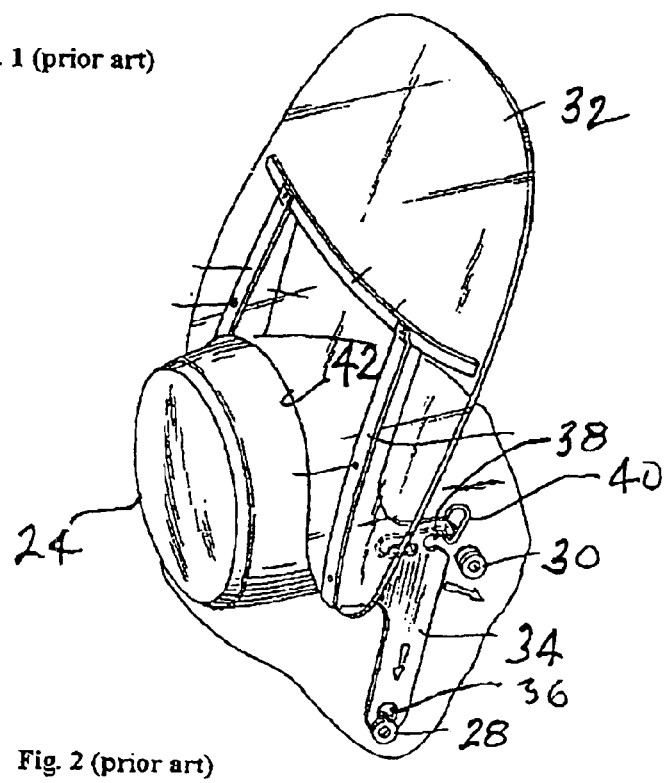
Figure 3:
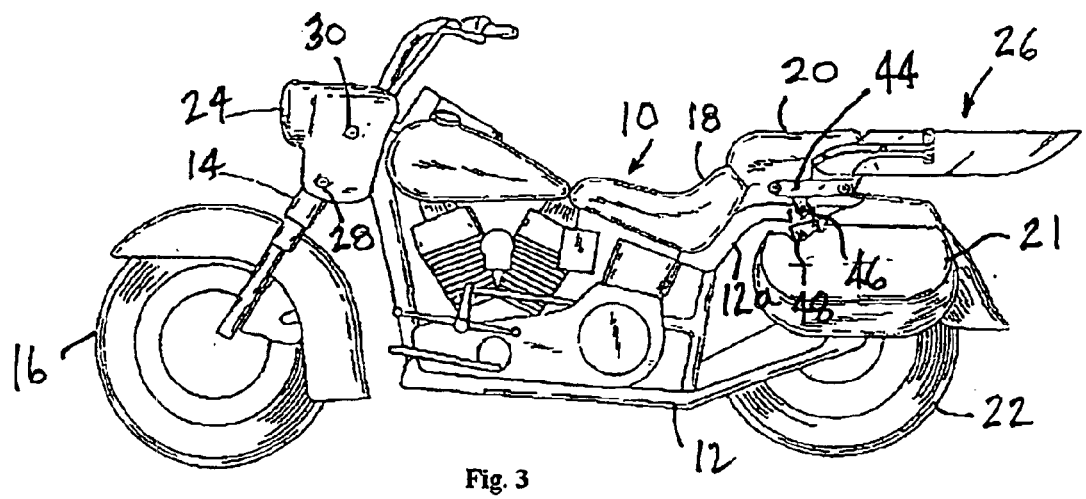
Figure 4:
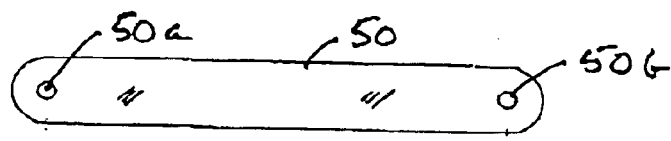
Figure 5:
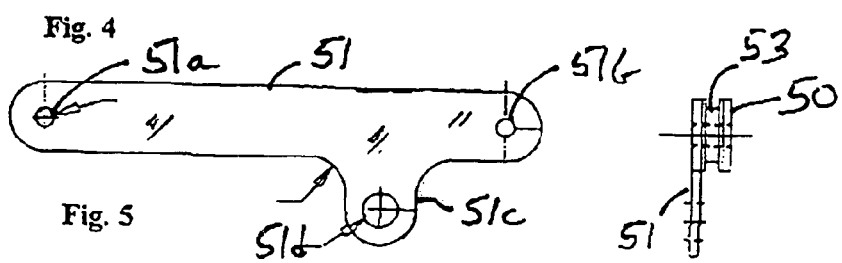
Figure 7:
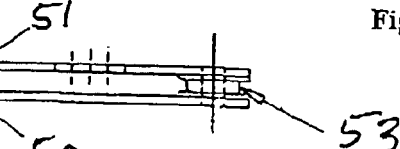
Figure 6:
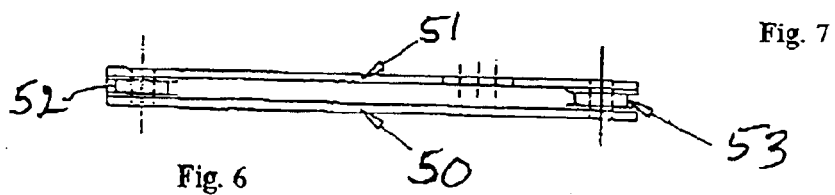
Figure 9:
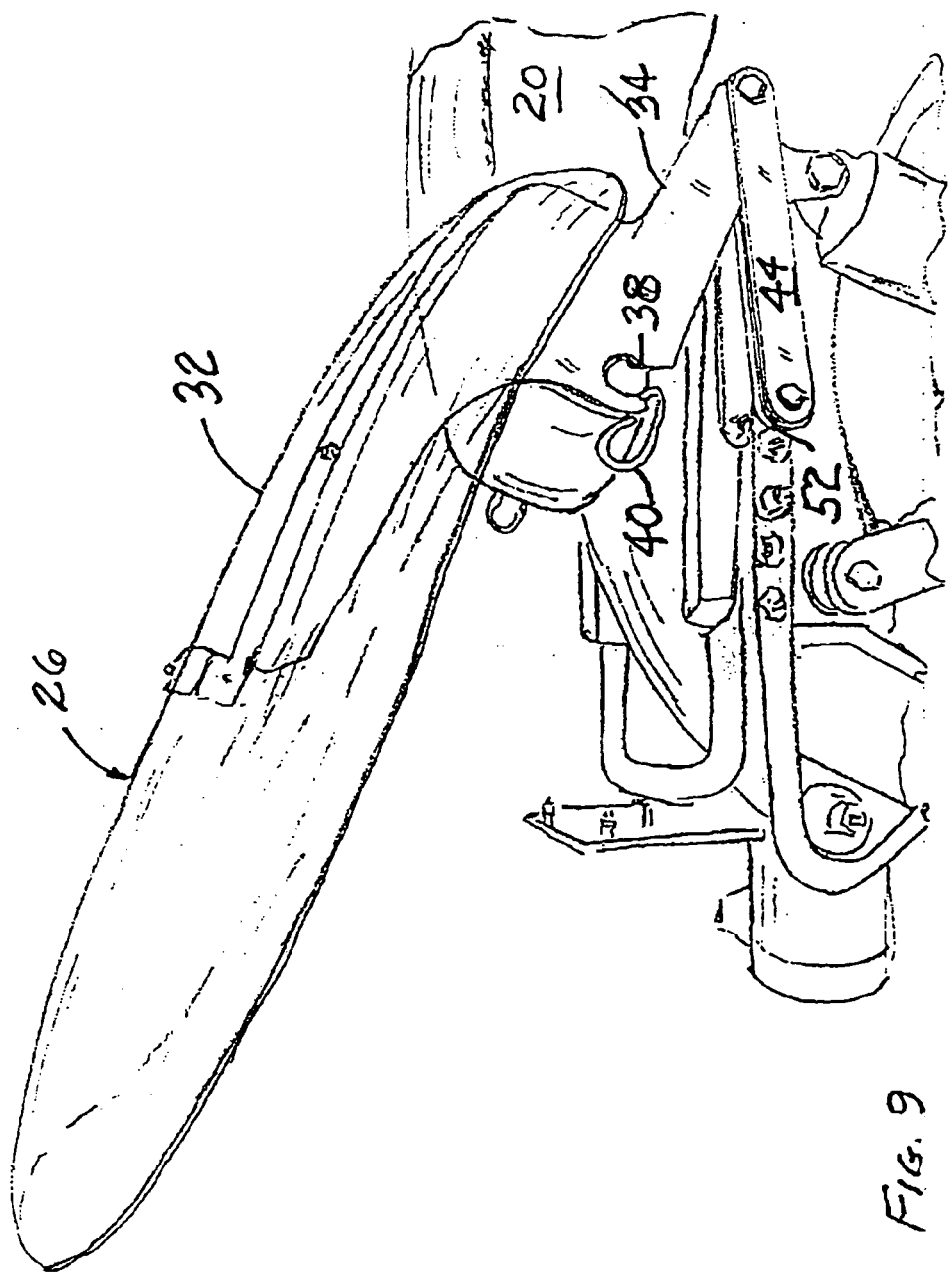
Figure 10:
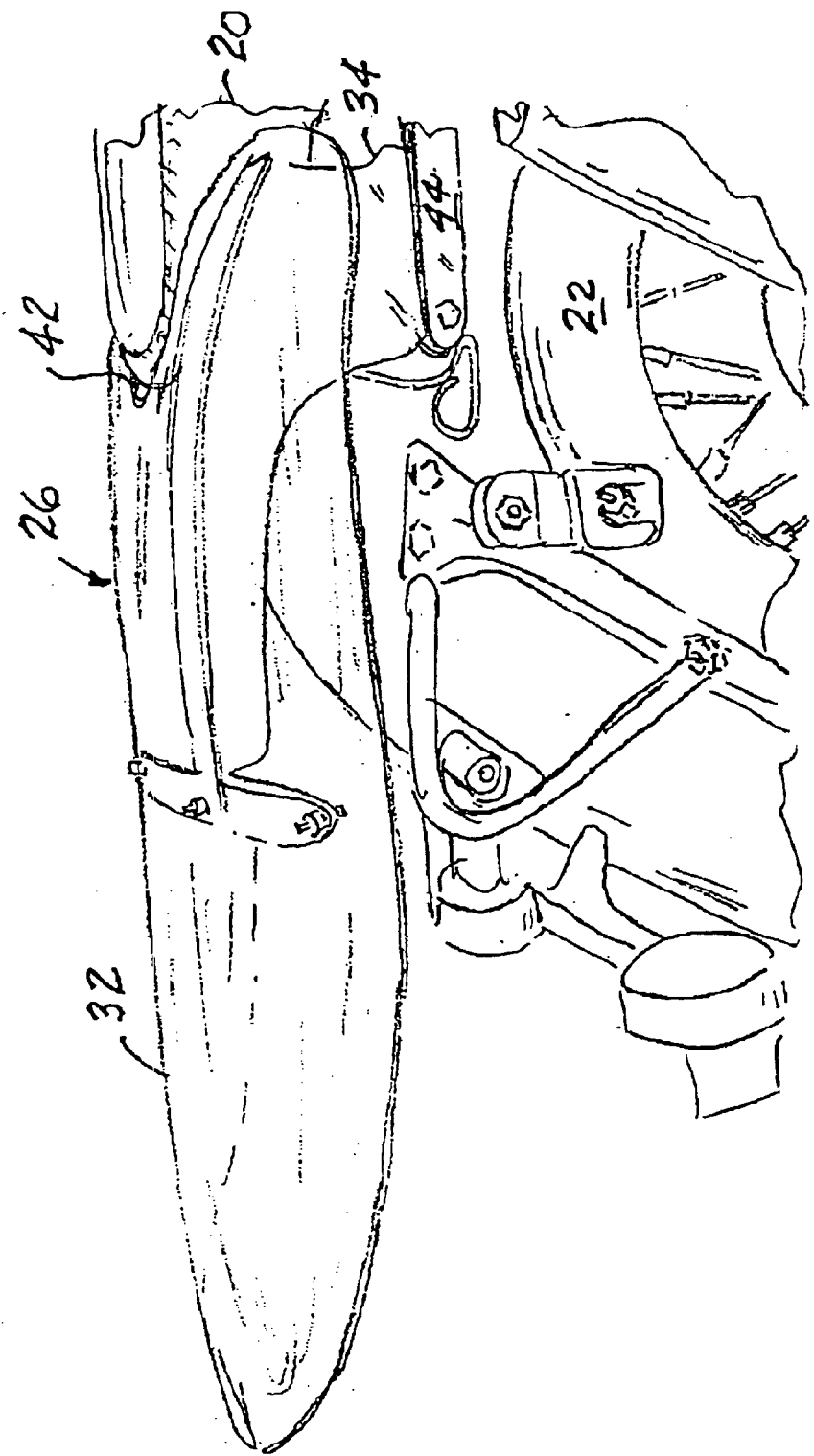
Figure 1:
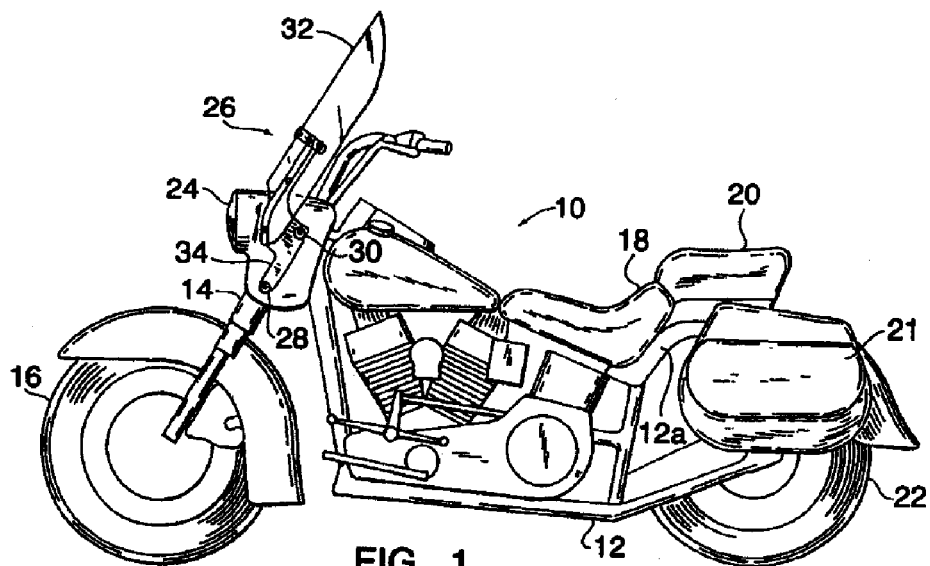
Figure 2:
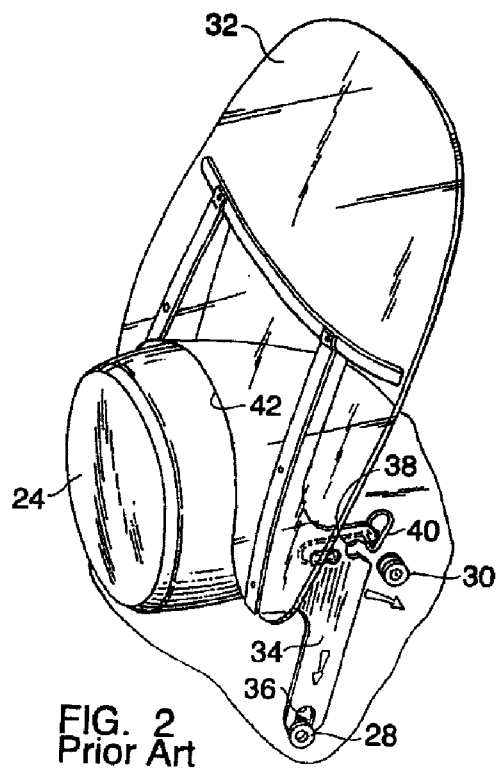
Figure 3:
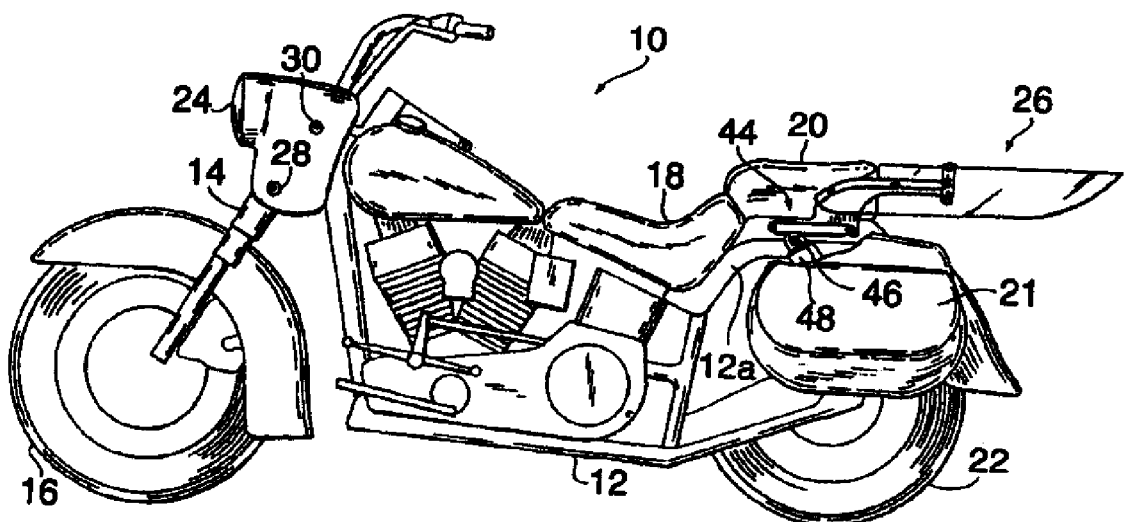
Figure 4:
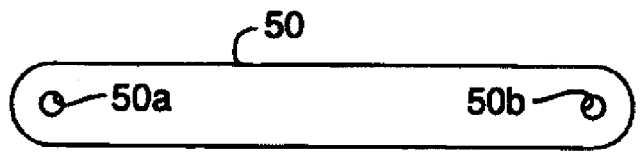
Figure 5:
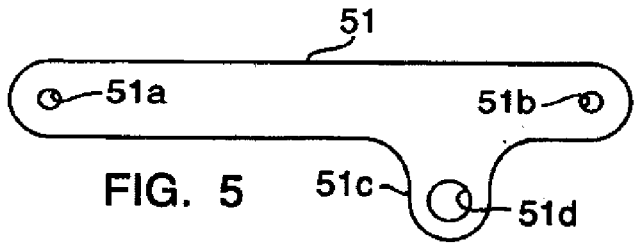
Figure 7:
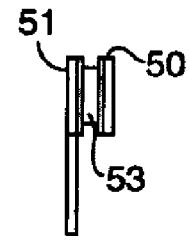
Figure 6:
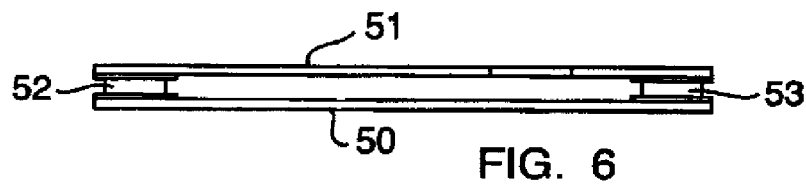
Figure 8:
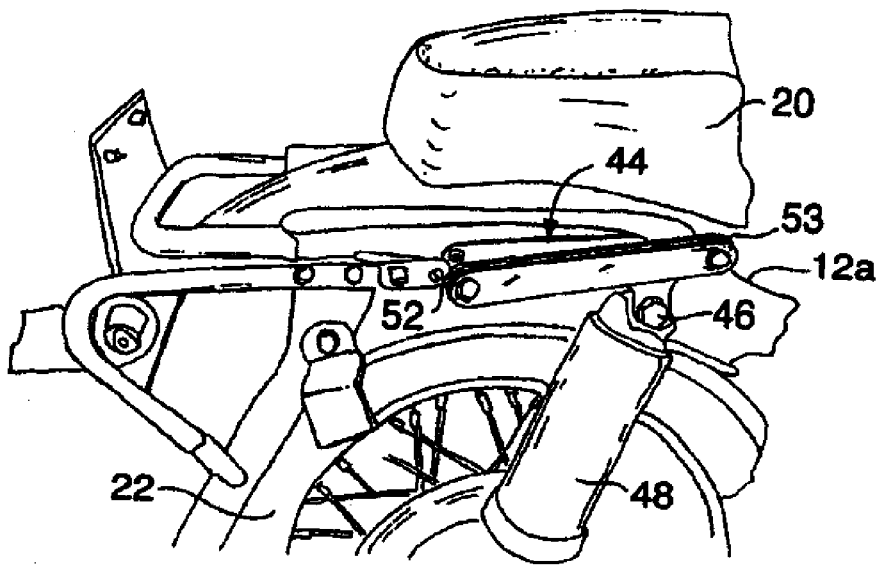
Figure 9:
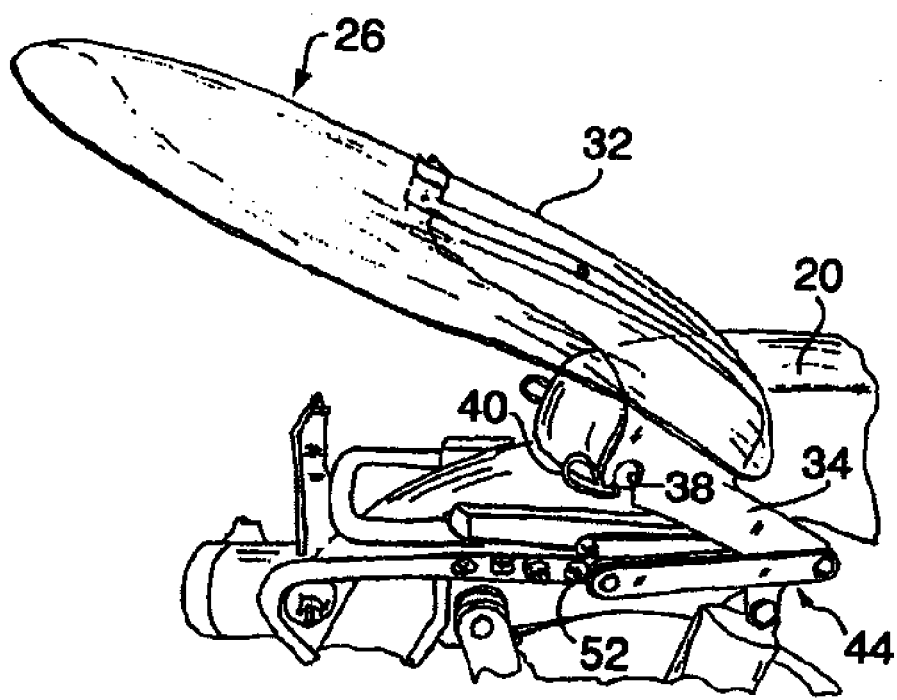
Figure 10:
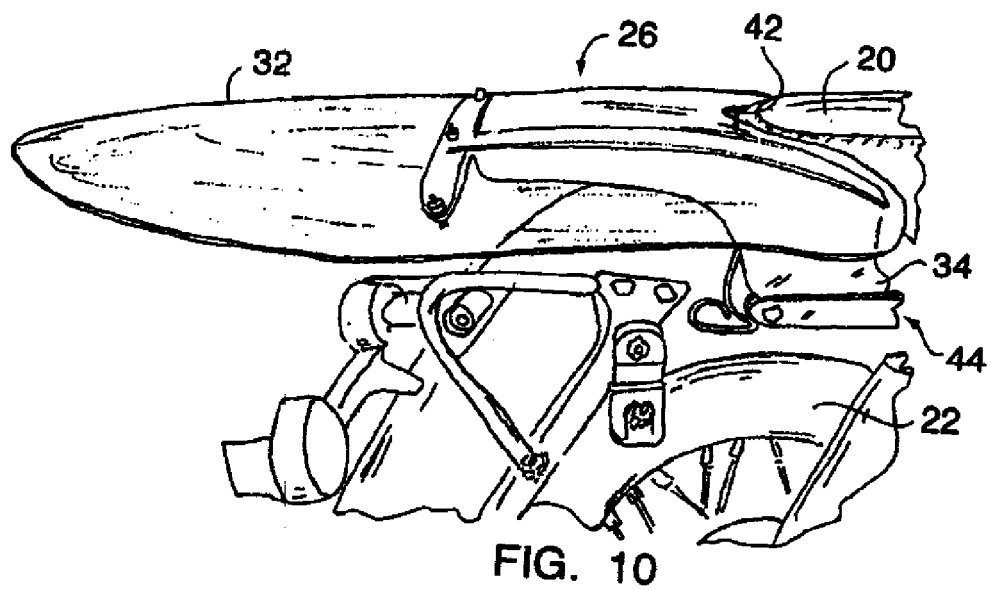

The invention will be better understood by reference to the following description, taken in connection with the accompanying drawing, in which:

FIG. 1 is a side elevation view of a prior art motorcycle with detachable windshield, FIG. 2 is a perspective drawing of a prior art detachable windshield showing the first mounting means, FIG. 3 is a side elevation drawing illustrating a motorcycle with the detachable windshield on an alternate rear mounting, FIGS. 4 and 5 are enlarged side elevation views of two components of a preferred rear mounting assembly, FIG. 6 is a plan view of the rear mounting assembly, FIG. 7 is an end elevation view of the rear mounting assembly, FIG. 8 is a partial view of a motorcycle incorporating a preferred form of rear mounting assembly, FIG. 9 is a view similar to FIG. 8 illustrating attachment of the windshield on the rear mounting assembly, and FIG. 10 is a view similar to FIG. 8 illustrating the windshield attached to the rear mounting assembly.

DETAILED DESCRIPTION OF THE INVENTION

Referring first to the two drawings of FIG. 1 and FIG. 2, a prior art motorcycle with detachable windshield is illustrated generally at 10. The motorcycle includes a frame assembly 12, a front fork 14 for steering the motorcycle with a front wheel 16 rotatably mounted thereon. To accommodate the rider and a passenger, there is a front seat 18 and a rear seat 20, collectively referred to herein as a seat. Accessories normally include items such as saddle bags 21. Frame assembly 12 collectively includes various interconnected structural members such as a member 12a, and conventional structural members, which may include a pivotable swing arm for rotatably mounting a rear wheel 22. The structural details of the motorcycle 10 are not relevant to the present invention, except to note that the space above rear wheel 22 and behind seat 20 is available for an alternate mounting according to the present invention, unless it is otherwise occupied by other conventional accessories such as a "sissy bar", or passenger back rest.

The front fork 14 carries a headlight 24 and front mounting means for receiving a detachable windshield, shown generally at 26. In this case, the front mounting means comprise a pair of bosses 28, 30 spaced longitudinally along the front fork. A similar pair of spaced bosses (not shown) are on the other side of the front fork. Bosses 28, 30 are better seen in the perspective view of FIG. 2. Detachable windshield 26 includes a transparent plastic member 32, to which are attached a pair of bracket arms, one being seen at 34. The bracket arms 34 include slots 36, 38 and a spring retainer 40, which are arranged to receive bosses 28, 30 so as to hold the windshield 26 in an upright, somewhat backward slanted position so as to deflect air from the rider of motorcycle 10. When in this position, a contoured edge 42 of the transparent plastic windshield is shaped to fit around the headlight 24 as shown in FIG. 2.

The details of quick attachment and detachment of the prior art windshield assembly 26 may be seen by referring to U.S. Pat. No. 5,658,035 issued Aug. 19, 1997 to Armstrong and assigned to Harley-Davidson Motor Company, which is incorporated herein by reference.

Referring now to FIG. 3 of the drawing, the same motorcycle 10 and the same detachable windshield 26 are shown using the same reference numerals as in the previous description, except that the detachable windshield 26 is shown disposed above the rear wheel 22 and behind the rear seat 20 in a substantially horizontal position. A portion of saddlebag 21 has been removed in order to reveal a rear mounting assembly 44 holding the detachable windshield 26. Preferably the rear mounting assembly 44 is constructed so as to duplicate the function of the front mounting bosses 28, 30, except that it is oriented in a different direction. Rear mounting assembly 44 is attached to the frame member 12a by a bolt 46 that also attaches a rear shock absorber 48 to frame member 12a. The details and method of attachment and location of the rear mounting assembly 44 will vary considerably with the style of motorcycle, shape and location of the seat 20 and general arrangement of the frame assembly to which it is attached. A preferred rear mounting assembly is illustrated in FIGS. 4–7 of the drawings.

Referring to FIGS. 4–7, a longitudinal member comprising metal plate 50 has holes 50a, 50b at opposite ends. Another longitudinal member with a lateral extension, comprising T-shaped metal plate 51, has equivalent spaced holes 51a, 51b at either end and a depending flange 51c with a mounting hole 51d. Fastening means such as bolts (not shown in FIGS. 4–7) secure the members together.

The assembly is provided with a pair of spacer grommets 52, 53. Grommets 52, 53 are spaced apart from one another and dimensioned to be equivalent to the bosses 28, 30. In this manner the bracket arm 34 will fit in the space between plates 50, 51 and attach to grommets 52, 53 in the same manner as described for the front mounting bosses 28, 30 on front fork 14. While two spaced longitudinal members are shown, it would also be possible to use only one longitudinal member with the grommets attached to it by suitable fastening means. However, the preferred arrangement uses a pair of spaced longitudinal members, with fastening means such as bolts running through the holes in the plates and through the grommets.

Referring to the partial views of a motorcycle shown in FIGS. 7–9, FIG. 7 illustrates the rear mounting assembly 44 attached by bolt 46 to frame member 12a, which also holds the top end of shock absorber 48. The structural details of different makes of motorcycle will vary and any convenient parts of the motorcycle frame assembly may be utilized that enable attachment of the rear mounting assembly in the desired location.

FIG. 8 illustrates the detachable windshield 26 being attached to the rear mounting assembly 44 by inserting a bracket arm between the parallel plates and hooking the slots over the grommets. One such slot 38 is seen with its spring retainer 40 being placed over the grommet 52. A similar bracket arm is being inserted at the same time between parallel plates of the opposite rear mounting assembly (not shown) on the other side of seat 20.

FIG. 9 illustrates the detachable windshield 26 fully attached in the rear mounting assembly 44 so as to hold the windshield in a substantially horizontal position above rear wheel 22 and behind seat 20. The contoured edge 42 fits around the back of seat 20.

The location of windshield 26 in the position shown in FIG. 9 enhances the appearance of the motorcycle and also serves as a wind deflector by streamlining the rear of the motorcycle.

While the preferred embodiment of the invention has been disclosed, it is desired to include in the appended claims all modifications as fall within the true spirit and scope of the invention.

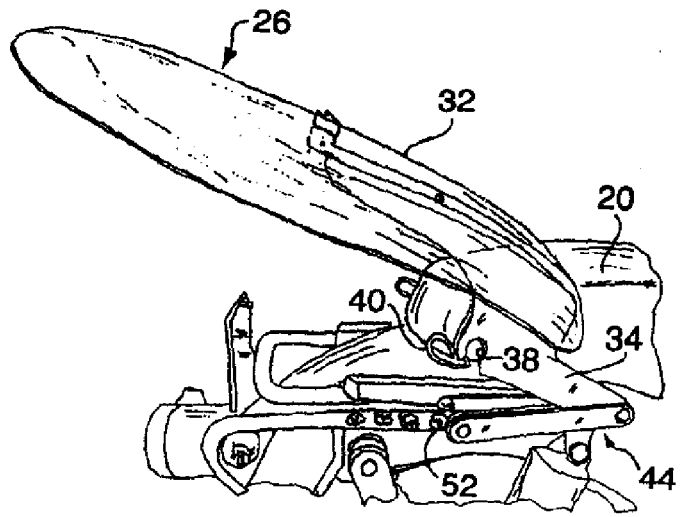

What is claimed is:

1. An improvement in a motorcycle with a detachable windshield, said motorcycle having a frame assembly, a front fork having windshield front mounting means thereon, a front wheel rotatably mounted on the front fork, a seat, a rear wheel rotatably mounted on the frame assembly, and a detachable windshield having a pair of bracket arms each defining spaced slots adapted for attachment and detachment from said front mounting means, said front mounting means being disposed on said frame so as to hold the windshield in an upright position to deflect air from a rider, the improvement comprising:

rear mounting means attached to said frame assembly beneath said seat and above said rear wheel, said mounting means being adapted to cooperate with said bracket arms for attachment and detachment from said rear mounting means and to hold the windshield in a substantially horizontal position above said rear wheel.

2. The improvement according to claim 1, wherein said rear mounting means comprises at least one longitudinal member, a pair of longitudinally spaced grommets disposed on said longitudinal member, said grommets being dimensioned to receive said slots, and means connecting said longitudinal member to said frame so that it extends in a substantially horizontal direction.

3. The improvement according to claim 1, wherein said rear mounting means comprises a first pair of parallel plates disposed beneath said seat and located to one side of said rear wheel and a second pair of parallel plates disposed beneath said seat and located to the other side of said rear wheel, each said pair of parallel plate separated by grommets so dimensioned and spaced from one another to receive said slots in the respective ones of said pair of bracket arms.

4. The method of mounting a detachable motorcycle windshield in an alternate location, comprising the steps of:

providing a motorcycle having a detachable windshield and front mounting means thereon adapted to hold said detachable windshield in a substantially upright position in front of a rider, providing rear mounting means on said motorcycle oriented to hold the detachable windshield in a substantially horizontal position behind said rider, detaching said windshield from said front mounting means, and attaching said windshield to said rear mounting means.

\* \* \* \* \*

UNITED STATES PATENT AND TRADEMARK OFFICE
CERTIFICATE OF CORRECTION

PATENT NO.   : 6,877,788 B2
DATED        : April 12, 2005
INVENTOR(S)  : Graham

It is certified that error appears in the above-identified patent and that said Letters Patent is hereby corrected as shown below:

Delete Title page illustrating figure, and substitute therefor new Title page illustrating figure. (atttached)

Delete drawing sheets 1-5, and substitute therefor drawing sheets 1-5, as shown on the attached sheets.

Signed and Sealed this

Twelfth Day of July, 2005

JON W. DUDAS
*Director of the United States Patent and Trademark Office*

(12) United States Patent
Graham

(10) Patent No.: US 6,877,788 B2
(45) Date of Patent: Apr. 12, 2005

(54) ALTERNATIVE MOUNTING FOR REMOVABLE MOTORCYCLE WINDSHIELD

(76) Inventor: Steven M. Graham, 10 Walter La., Oxford, CT (US) 06478

( * ) Notice: Subject to any disclaimer, the term of this patent is extended or adjusted under 35 U.S.C. 154(b) by 0 days.

(21) Appl. No.: 10/703,059

(22) Filed: Nov. 6, 2003

(65) Prior Publication Data

US 2004/0140686 A1 Jul. 22, 2004

Related U.S. Application Data

(60) Provisional application No. 60/424,551, filed on Nov. 7, 2002.

(51) Int. Cl.$^7$ ............................................. B62J 17/00
(52) U.S. Cl. ........................... 296/78.1; 248/205.1
(58) Field of Search ..................... 296/78.1, 84.1, 296/77.1; 248/205.1; 206/448

(56) References Cited

U.S. PATENT DOCUMENTS

| | | | | |
|---|---|---|---|---|
| 2,903,297 A | * | 9/1959 | Zbikowski | 296/78.1 |
| 4,168,098 A | * | 9/1979 | Willey | 296/78.1 |
| 5,732,965 A | * | 3/1998 | Willey | 296/78.1 |
| 5,845,955 A | * | 12/1998 | Willey | 296/78.1 |
| 5,853,217 A | * | 12/1998 | Armstrong | 296/78.1 |
| 5,857,727 A | * | 1/1999 | Vetter | 296/78.1 |
| 5,927,791 A | * | 7/1999 | De Voe | 296/78.1 |
| 6,196,614 B1 | * | 3/2001 | Willey | 296/78.1 |
| 6,254,166 B1 | * | 7/2001 | Willey | 296/78.1 |
| 6,543,831 B2 | * | 4/2003 | Takemura et al. | 296/78.1 |
| 6,679,537 B1 | * | 1/2004 | Putnam, Jr. | 296/78.1 |
| 2003/0052031 A1 | * | 3/2003 | Poore | 206/448 |
| 2003/0218109 A1 | * | 11/2003 | Farnham | 248/205.1 |

* cited by examiner

*Primary Examiner*—Kiran Patel
(74) *Attorney, Agent, or Firm*—McCormick, Paulding & Huber LLP

(57) ABSTRACT

A pair of rear mounting brackets are constructed to duplicate the front mounting on a motorcycle that holds a detachable windshield. The rear mounting brackets are attached to the motorcycle and are oriented to hold the windshield in a horizontal position behind the rider when the windshield is not in use.

4 Claims, 5 Drawing Sheets